United States Patent [19]

Kukes et al.

[11] Patent Number: 4,687,568

[45] Date of Patent: Aug. 18, 1987

[54] CATALYTIC HYDROFINING OF OIL

[75] Inventors: Simon G. Kukes; Stephen L. Parrott, both of Bartlesville, Okla.

[73] Assignee: Phillips Petroleum Company, Bartlesville, Okla.

[21] Appl. No.: 909,347

[22] Filed: Sep. 19, 1986

[51] Int. Cl.$^4$ ............................................. C10G 45/00
[52] U.S. Cl. ............................... 208/251 H; 208/217; 208/254 H; 502/213
[58] Field of Search ................ 208/251 H, 217, 254 H

[56] References Cited

U.S. PATENT DOCUMENTS

| | | | |
|---|---|---|---|
| 3,205,165 | 9/1965 | Hilfman | 208/254 |
| 3,493,517 | 2/1970 | Jaffe | 252/437 |
| 3,546,105 | 12/1970 | Jaffe | 208/216 |
| 3,577,353 | 5/1971 | White | 252/465 |
| 3,627,672 | 12/1971 | Kittrell et al. | 208/143 |
| 3,673,079 | 6/1972 | Mulaskey et al. | 208/111 |
| 3,686,137 | 8/1972 | Gatti | 208/254 H |
| 3,836,453 | 9/1974 | Kovach et al. | 208/254 H |
| 3,898,155 | 8/1975 | Wilson | 208/251 H |
| 3,904,550 | 9/1975 | Pine | 252/437 |
| 3,968,028 | 7/1976 | Frayer et al. | 208/251 H |
| 4,014,821 | 3/1977 | Kamner | 252/470 |
| 4,033,861 | 7/1977 | Holloway et al. | 208/254 H |
| 4,422,960 | 12/1983 | Shiroto et al. | 502/206 |
| 4,444,655 | 4/1984 | Shiroto et al. | 208/210 |
| 4,450,068 | 5/1984 | Kukes | 208/251 H |
| 4,459,372 | 7/1984 | Areno | 502/337 |
| 4,582,594 | 4/1986 | Kukes et al. | 208/254 H |

FOREIGN PATENT DOCUMENTS 0210993 12/1983 Japan ............................. 208/251 H

*Primary Examiner*—Andrew H. Metz
*Assistant Examiner*—Helane Myers
*Attorney, Agent, or Firm*—K. K. Brandes

[57] ABSTRACT

A process for hydrotreating substantially liquid hydrocarbon-containing feed streams (particularly heavy oils) which also contain compounds of nickel, vanadium and sulfur employing a catalyst composition comprising alumina, at least one compound of nickel, at least one compound of zirconium and at least one compound containing phosphorus and oxygen is prepared by a process comprising the steps of impregnating an alumina-containing support material with an aqueous solution containing at least one nickel compound and at least one zirconium compound, drying, impregnating the Ni/Zr-impregnated material with an aqueous solution containing at least one P-O compound, drying and calcining.

13 Claims, No Drawings

CATALYTIC HYDROFINING OF OIL

BACKGROUND OF THE INVENTION

This invention relates to catalytic hydrotreating of liquid hydrocarbon-containing feed stream, in particular heavy petroleum fractions.

The use of alumina, promoted with transition metal compounds, for hydrotreating (e.g., demetallizing, desulfurizing, denitrogenating, hydrocracking) liquid hydrocarbon feed streams, which contain metal, sulfur and nitrogen impurities, is well known. However, there is an ever present need to develop new catalysts that are less expensive and/or more effective in removing these impurities from such feed streams than those presently employed. The removal of these impurities is desirable because they can poison catalysts in downstream operations such as catalytic cracking and can cause pollution problems when hydrocarbon products from these feed streams are used as fuels in combustion processes.

SUMMARY OF THE INVENTION

It is an object of this invention to provide an effective hydrofining catalyst composition. It is another object of this invention to provide a process for preparing a new, effective hydrofining catalyst composition. It is a still further object of this invention to employ a new catalyst composition in a process for the removal of sulfur, nickel, vanadium and other impurities from hydrocarbon-containing oils. Other objects and advantages will be apparent from the detailed description and the appended claims.

In accordance with this invention, there is provided a composition of matter (suitable as a catalyst composition) comprising (preferably consisting essentially of) alumina, at least one compound of nickel, at least one compound of zirconium and at least one compound of phosphorus, wherein said composition of matter is prepared by a process comprising the steps of:

(A) impregnating a support material comprising (preferably consisting essentially of) alumina with a solution comprising (preferably consisting essentially of) water, at least one compound of nickel and at least one compound of zirconium;

(B) heating the material obtained in step (A) under such conditions as to substantially dry said material obtained in step (A);

(C) impregnating the substantially dried material obtained in step (B) with a solution comprising (preferably consisting essentially of) water and at least one compound containing phosphorus and oxygen;

(D) heating the material obtained in step (C) at a first temperature so as to at least partially dry said material obtained in step (C);

(E) heating (i.e., calcining) the at least partially dried material obtained in step (D) at a second temperature, which is higher than said first temperature, so as to activate said at least partially dried material obtained in step (D).

Preferably, step (B) is carried out at a temperature high enough that the compounds of nickel and zirconium contained in the material obtained in step (A) are at least partially converted to oxides of nickel and zirconium.

Also in accordance with this invention, a substantially liquid hydrocarbon-containing feed stream, which also contains compounds of nickel, vanadium and sulfur as impurities, is simultaneously contacted with a free hydrogen-containing gas and the composition of matter prepared by the process comprising steps (A) through (E), under such hydrotreating conditions as to produce a hydrocarbon-containing stream having a reduced levels nickel, vanadium and sulfur.

DETAILED DESCRIPTION OF THE INVENTION

The alumina support material used in the preparation of the catalyst composition of this invention can be any alumina or partially hydrated forms thereof, preferably substantially pure. Generally, the surface area (determined by BET/$N_2$; ASTM D3037) of said support material ranges from about 20 to about 350 $m^2/g$. The support material may contain transition metals such as those of Groups IB, VB, VIB, VIIB and VIII of the Periodic Table (as defined by "College Chemistry", by W. H. Nebergall et al, 4th Edition, D.C. Heath and Co., 1972), e.g., Mo or Co or compounds thereof. At present, it is not preferred to have more than only traces of these transition metals present, i.e., the level of these transition metals should be less than 0.2 weight-%, based on the weight of the entire alumina-containing material (before impregnation with Ni, Zr and P-O compounds). It is within the scope of this invention (yet presently not preferred) to employ mixtures of alumina with other inorganic refractory materials such as silica, aluminosilicates (such as zeolites), magnesia, titania, zirconia, aluminum phosphate, zirconium phosphate, alumina-silica, alumina-titania, zeolite-alumina, zeolite-silica and the like. Generally, the above-mentioned refractory materials will not exceed about 3 weight-%, based on the weight of the alumina-containing support material.

Any suitable nickel compounds can be employed in step (A) as long as it is at least partially soluble in water. Non-limiting examples of suitable nickel compounds are: nickel(II) nitrate, nickel(II) sulfate, nickel(II) hydrogen sulfate, ammonium nickel(II) sulfate, nickel(II) bicarbonate, nickel(II) formate, nickel(II) acetate, nickel(II) thiocyanate, nickel(II) halides, ammonia complexes of the above-listed nickel compounds and of hydroxide, oxalate and carbonate of nickel, and mixtures thereof. It is understood that these nickel compounds may exist in hydrated from. The presently preferred nickel compound is nickel(II) nitrate, more preferably as $Ni(NO_3)_2 \cdot 6H_2O$.

Any suitable zirconium compound can be employed in step (A), as long as it is at least partially soluble in water. Non-limiting examples of suitable zirconium compounds are: zirconium halides, zirconyl halides such as $ZrOCl_2$ and $ZrOBr_2$, zirconium sulfate, zirconyl sulfate, zirconium hydrogen sulfate, zirconyl hydrogen sulfate, zirconium nitrate, zirconyl nitrate, zirconium carboxylates such as $Zr(C_2O_4)_2$ and mixtures thereof. It is understood that the zirconium compounds may exist in hydrated form. The presently preferred zirconium compound is $ZrO(NO_3)_2 \cdot 5H_2O$.

Any suitable phosphorus and oxygen containing compound can be employed in step (C), as long as it is at least partially soluble in water. Preferably, the phosphorus and oxygen compounds used in step (C) is selected from the group consisting of $H_3PO_4$, $H_4P_2O_7$, $(HOP_3)_n$, $NH_4H_2PO_4$, $LiH_2PO_4$, $NaH_2PO_4$, $KH_2PO_4$, $RbH_2PO_4$, $CsH_2PO_4$, $(NH_4)_2HPO_4$, $Li_2HPO_4$, $Na_2HPO_4$, $K_2HPO_4$, $Rb_2HPO_4$, $Cs_2HPO_4$, $(NH_4)_3PO_4$, $Na_3PO_4$, $K_3PO_4$, $Rb_3PO_4$ $Cs_3PO_4$, ammonium and alkali metal pyrophosphates, ammonium and alkali metal metaphosphates, $H_3PO_3$, ammonium and alkali metal phosphites, and mixtures thereof. Presently more preferred is $NH_4H_2PO_4$.

Even though it is preferred to employ substantially clear aqueous solutions in steps (A) and (C), it is within the scope of this invention to use aqueous solutions having solid particles dispersed therein. In this case, the solutions plus dispersed particles can be used "as is" in steps (A) and (C), or, preferably, the dispersed solid particles are separated from the solutions by any suitable separation means such as filtration, centrifugation or settling and subsequent draining, before the solutions are used for the impregnation of alumina.

The approximate concentrations, expressed in gram-atomic weights (herein referred to as mol) per liter of solution, of the compounds of nickel, zirconium and phosphorus in the impregnating solutions used in steps (A) and (C) are as follows:

|  | Broad | Intermediate | Narrow |
|---|---|---|---|
| Step (A): |  |  |  |
| Mol/l Ni | 0.01–3.0 | 0.02–1.0 | 0.05–0.5 |
| Mol/l Zr | 0.01–3.0 | 0.02–1.0 | 0.05–0.5 |
| Step (C): |  |  |  |
| Mol/l P | 0.02–6.0 | 0.04–2.0 | 0.1–1.0 |

It is within the scope of this invention, even though presently not preferred, to have additional transition metal compounds present in each of the impregnating solutions described above. Examples of these additional transition metal compounds are those of V, Mo, W, Mn, Co, Cu and the like. If these additional transition metal compounds compounds are present, their concentrations are generally small, i.e., less than the concentrations of compounds of Ni, Zr and P. At present, it is preferred that these additional transition metal compounds are substantially absent in the impregnating solutions.

The heating steps (B) and (D) are generally carried out in air or an inert gas, at a temperature ranging from about 40° C. to about 600° C. so as to remove the greatest portion of water from the mixture obtained in the preceding step. The preferred temperature for step (B) is in the range of from about 80° C. to about 500° C.; the preferred temperature for step (D) is in the range of from about 50° C. to about 200° C. Vacuum conditions may be employed but are presently not preferred. The substantially dried material obtained in step (B) generally contains less than about 5 weight-% water. The at least partially dried material obtained in step (D) generally contains less than 20 weight-% water. The rate of heating is controlled so as to avoid surges of water vapor that can cause the impregnating solution to splatter and to excessively accumulate in certain surface regions of the solid support material. Depending on the heating temperature and specific heating conditions (such as extent of air movement and thickness of the solid layer to be dried), the heating time ranges generally from about 0.5 hour to about 100 hours, preferably from about 1 hour to about 30 hours.

The preferred heating (calcining) conditions in step (E) comprise heating in a non-reducing gas atmosphere, a temperature ranging from about 200° C. to about 800° C. (more preferably from about 400° C. to about 600° C.) and a heating time ranging from about 1 to about 10 hours. Presently preferred specific calcining conditions are described in Example I (Catalyst A). Generally, the heating is carried out in a free oxygen containing atmosphere, preferably air. But other non-reducing gases, e.g., nitrogen, helium, neon, argon, krypton, xenon or mixtures thereof, may also be employed.

The terms "activate" and "activation" as used herein means that the calcined catalyst composition of this invention is a more effective catalyst for hydrotreating reactions, particularly hydrodemetallization and hydrodesulfurization of liquid hydrocarbon-containing feed streams, than the at least partially dried mixture obtained in preceding step (D).

The calcined composition of matter of this invention obtained in step (E) generally contains from about 0.1 to about 10 weight-% Ni, from about 0.2 to about 15 weight-% Zr and from about 0.1 to about 10 weight-% P, based on the entire composition of matter; and preferably contains from about 0.3 to about 3.0 weight-% Ni, from about 0.5 to about 5.0 weight-% Zr and from about 0.3 to about 5.0 weight-% P, based on the entire composition of matter.

The surface area (determined by the $BET/N_2$ method; ASTM D3037) of the calcined catalyst compositions of matter of this invention generally is in the range of from about 20 to about 350 m$^2$/g, preferably in the range of from about 100 to about 250 m$^2$/g. The pore volume (determined by mercury intrusion using an Autopore 9200 instrument of Micromeretics, Norcross, Georgia) generally is in the range of from about 0.2 to about 2.0 cc/g. The compositions of matter of this invention can be pelletized or compacted into various shapes (e.g., spherical, cylindrical or trilobal) for convenient shipping and use in fixed catalyst beds.

In one embodiment, the composition of matter (catalyst composition) of this invention obtained in step (E) is presulfided by the additional step (F) by contacting the calcined compositions of matter with at least one suitable sulfur compound under such conditions as to at least partially convert nickel compounds contained in the calcined catalyst composition to nickel sulfide. This can be accomplished by passing a sulfur-containing gas oil or a solution of COS or mercaptans or organic sulfides, e.g., in a hydrocarbon solvent, over the catalyst composition at an elevated temperature (e.g., at about 300°–650° F.), generally in the presence of hydrogen gas; or a gaseous mixture of hydrogen and hydrogen sulfide (e.g. at a volume ratio of about 10:1) can be passed over the catalyst composition at an elevated temperature, preferably 1–15 hours at about 400° F. and then 1–15 hours at about 700° F. This presulfiding step is particularly desirable when the catalyst composition of this invention is used for hydrotreating or hydrocracking of liquid hydrocarbon containing feed streams.

The composition of matter of this invention can be used as a catalyst composition for a variety of reactions such as hydrocarbon conversion reactions. In one preferred embodiment of this invention, the catalyst composition of this invention is used as a catalyst for hydrotreating substantially liquid hydrocarbon-containing feed streams, which also contain compounds of sulfur, nickel and vanadium as impurities, and generally also asphaltenes, coke precursors (measured as Ramsbottom carbon residue) and nitrogen compounds. Suitable hydrocarbon containing feed streams include crude oil and fraction thereof, petroleum products, heavy oil extracts, coal pyrolyzates, liquefied coal products, products from tar sands, shale oil and shale oil products. The catalyst compositions are particularly suited for treating heavy topped crudes and heavy oil residua, which generally has an initial boiling point in excess of about 400° F., preferably in excess of about 600° F., containing about 5-1000 ppmw (parts by weight per million by weight of feed stream) of vanadium, about 3-500 ppmw of nickel, about 0.3-5 weight-% sulfur, about 0.2-2 weight-% nitrogen, and having an $API_{60}$ gravity of about 5-25.

The hydrotreating process of this invention employing the catalyst composition of this invention is carried out in any apparatus whereby an intimate contact of the catalyst composition with said hydrocarbon-containing feed stream and a free hydrogen containing gas is achieved, under such conditions as to produce a hydrocarbon-containing product having a reduced level of nickel, vanadium and sulfur. Generally, a lower level of nitrogen and Ramsbottom carbon residue and a higher value of $API_{60}$ gravity are also attained in this hydrotreating process. The hydrotreating process can be carried out using a fixed catalyst bed (presently preferred) or a fluidized catalyst bed or a moving catalyst bed or an agitated slurry of the catalyst in the oil feed (hydrovisbreaking operation). The hydrotreating process can be carried out as a batch process or, preferably, as a continuous process, more preferably in a tubular reactor containing one or more fixed catalyst beds or in a plurality of fixed bed reactors in parallel or in series.

The catalyst composition of this invention can be used in said hydrotreating process alone in a reactor or may be used in combination with essentially unpromoted refractory materials such as alumina, silica, titania, magnesia, silicates, metal aluminates, alumino-silicates (e.g., zeolites), titania and metal phosphates. Alternating layers of the refractory material and of the catalyst composition can be used, or the catalyst composition can be mixed with the refractory material. Use of the refractory material with the catalyst composition provides for better dispersion of the hydrocarbon-containing feed stream. Also, other catalysts such as known hydrogenation and desulfurization catalysts (e.g., $NiO/MoO_3$, $CoO/MoO_3$, and $NiO/CoO/MoO_3$ on alumina) may be used with the catalyst composition of this invention to achieve simultaneous demetallization, desulfurization, denitrogenation, hydrogenation and hydrocracking, if desired. In one embodiment of said hydrocarbon hydrotreating process, the catalyst composition has been presulfided, as described above, before being used.

Any suitable reaction time between the catalyst composition, the hydrocarbon-containing feed stream and hydrogen gas can be utilized. In general, the reaction time will range from about 0.05 hours to about 10 hours. Preferably, the reaction time will range from about 0.4 to about 5 hours. Thus, the flow rate of the hydrocarbon-containing feed stream should be such that the time required for the passage of the mixture through the reactor (residence time) will preferably be in the range of about 0.4 to about 5 hours. In a continuous fixed bed operation, this generally requires a liquid hourly space velocity (LHSV) in the range of about 0.10 to about 20 cc of feed per cc of catalyst per hour, preferably from about 0.2 to about 2.5 cc/cc/hr.

The hydrotreating process employing the catalyst composition of the present invention can be carried out at any suitable temperature. The temperature will generally be in the range of about 250° C. to about 550° C. and will preferably be in the range of about 350° C. to about 450° C. Higher temperatures do improve the removal of metals, but temperatures which will have adverse effects on the hydrocarbon containing feed stream, such as excessive coking, will usually be avoided. Also, economic considerations will usually be taken into account in selecting the operating temperature. Lower temperatures can generally be used for lighter feeds.

Any suitable pressure may be utilized in the hydrotreating process of this invention. The reaction pressure will generally be in the range of about atmospheric pressure (0 psig) to up to about 5,000 psig. Preferably, the pressure will be in the range of about 100 to about 2500 psig. Higher pressures tend to reduce coke formation but operating at high pressure may be undesirable for safety and economic reasons.

Any suitable quantity of hydrogen can be added to the hydrotreating process. The quantity of hydrogen used to contact the hydrocarbon containing feed stock will generally be in the range of about 100 to about 10,000 standard cubic feet $H_2$ per barrel of the hydrocarbon containing feed stream and will more preferably be in the range of about 1000 to about 6000 standard cubic feet $H_2$ per barrel of the hydrocarbon containing feed stream.

In general, the catalyst composition is utilized primarily for demetallization until a satisfactory level of metals (Ni, V) removal is no longer achieved. Catalyst deactivation generally results from the coating of the catalyst composition with coke and metals removed from the feed. It is possible to remove the metals from the catalyst. But it is generally contemplated that once the removal of metals falls below a desired level, the spent (deactivated) catalyst will simply be replaced by fresh catalyst.

The time in which the catalyst composition of this invention will maintain its activity for removal of metals and sulfur will depend upon the metals concentration in the hydrocarbon containing feed streams being treated. Generally the catalyst composition can be used for a period of time long enough to accumulate about 20-200 wt. % of metals, mostly Ni and V, based on the initial weight of the catalyst composition, from the hydrocarbon containing feed. In other words, the weight of the spent catalyst composition will be about 20-200% higher than the weight of the fresh catalyst composition.

Generally, at least a portion of the hydrotreated product stream having reduced metal and sulfur contents is subsequently cracked in a cracking reactor, e.g. in a fluidized catalytic cracking unit, under such conditions as to produce lower boiling hydrocarbon materials (i.e., having a lower boiling range at 1 atm. than the feed hydrocarbons) suitable for use as gasoline, diesel fuel, lubricating oils and other useful products. It is within the scope of this invention to hydrotreat said product stream having reduced metal and sulfur contents in one or more processes using different catalyst compositions, such as alumina-supported $NiO/MoO_3$ or $CoO/MoO_3$ catalysts, for further removal of sulfur and other impurities, before the product stream is introduced into the cracking reactor.

A further embodiment of this invention is a hydrofining process comprising the step of introducing at least one thermally decomposable metal compound into the hydrocarbon containing feed stream prior to its being contacted with the catalyst composition of this invention. The metal in the decomposable metal compound is selected from the group consisting of the metals of Group IV-B, Group V-B, Group VI-B, Group VII-B, Group VIII and IB of the Periodic Table of Elements (as defined in "College Chemistry" by W. H. Nebergall et al, D. C. Health and Company, 1972). Preferred metals are molybdenum, tungsten, manganese, chromium, zirconium and copper. Molybdenum is a particularly preferred metal which may be introduced as a carbonyl, acetylacetonate, carboxylate having 1-12 C atoms per molecule (e.g., acetate, octoate, oxalate), naphthenate, mercaptide, dithiophosphate or dithiocarbamate. Molybdenum hexacarbonyl, molybdenum dithiophosphate and molybdenum dithiocarbamate are particularly preferred additives. The life of the catalyst composition and the efficiency of the demetallization process is improved by introducing at least one of the above-cited decomposable metal compounds into the hydrocarbon-containing feed, which also contains metals such as nickel and vanadium. These additives can be added continuously or intermittently and are preferably added at a time when the catalyst composition of this invention has been partially deactivated so as to extend its life.

Any suitable concentration of these additives may be added to the hydrocarbon-containing feed stream. In general, a sufficient quantity of the additive will be added to the hydrocarbon-containing feed stream to result in a concentration of the metal (preferably molybdenum) in said decomposable compounds ranging from about 1 to about 1000 parts per million and more preferably in the range of about 5 to about 100 parts per million in the feed stream.

The following examples are presented in further illustration of the invention and are not to be considered as unduly limiting the scope of this invention.

EXAMPLE I

This example illustrates the preparation of several hydrofining catalysts.

Catalyst A (Invention)

This catalyst was prepared in accordance with the method of this invention: first impregnation of alumina with compounds of Ni and Zr, then impregnation with a P-O compound. The catalyst contained 0.94 weight-% Ni, 0.95 weight-% Zr and 1.96 weight-% P. Catalyst A was prepared as follows:

A first solution was prepared by dissolving 2.2 grams of $Ni(NO_3)_2.6H_2O$ and 1.6 grams of $ZrO(NO_3)_2.5H_2O$ in 50 cc of deionized water. This solution was thoroughly mixed with 46.1 grams of Ketjen 32685 alumina (provided by Ketjen Catalyst Division of Akzona, Inc., Pasadena, Tex.) having a $BET/N_2$ surface area of 159 $m^2/g$ and a pore volume (measured by mercury porosimetry) of 1.03 cc/g. This mixture was kept in an open dish at room temperature for about 2 hours, dried under an IR heat lamp and calcined in air at 800° F. for 4 hours. This material is labeled $A^1$.

A second solution was prepared by dissolving 359 grams of $NH_4H_2PO_4$ in 50 cc of water thoroughly mixed with material $A^1$. This mixture was kept in an open dish at room temperature for a couple of hours, then dried under a heat lamp and finally calcined in air at 800° F. for 4 hours.

Catalyst B (Control)

This catalyst was prepared by impregnating alumina first with a P-O compound and then with compounds of Ni and Zr. This catalyst contained 0.94 weight-% Ni, 0.96 weight-% Zr and 1.96 weight-% P, and was prepared as follows.

A first solution was prepared by dissolving 13.70 grams of $NH_4H_2PO_4$ in enough water to make 195 cc of a solution. This solution was thoroughly mixed with 176.0 grams of Ketjen 32685 alumina, kept in an open dish at room temperature for several hours, dried under an IR heat lamp and calcined at 800° F. for 4 hours. This material is labeled $B^1$.

A second solution was prepared by dissolving 1.10 grams of $Ni(NO_3)_2.6H_2O$ and 0.80 grams of $ZrO(NO_3)_2.5H_2O$ in enough water to make 25 cc of a solution. This second solution was thoroughly mixed with 23.1 grams of material $B^1$, kept at room temperature in an open dish at room temperature for several hours, dried under an IR heat lamp and calcined at 400° F. for about 2.5 hours and then at 800° F. for about 2.5 hours.

Catalyst C (Control)

This catalyst was prepared by sequential impregnation of alumina with a P-O compound, then a Ni compound and finally a Zr compound. The promoter level of C was essentially the same as that of A and B (0.94% Ni, 0.96% Zr, 1.96% P). It was prepared as follows.

A first solution was prepared by dissolving 1.21 grams of $Ni(NO_3)_2.6H_2O$ in 27.5 cc of water. This solution was thoroughly mixed with material $B^1$ (see under Catalyst B), kept in an open dish at room temperature for several hours, dried under a heat lamp and then calcined at 800° F. for 4 hours. This material is labeled $C^1$.

A second solution was prepared by dissolving 0.88 grams of $ZrO(NO_3).5H_2O$ in 27.5 cc of water. This second solution was thoroughly mixed with material $C^1$ and dried and calcined at described for $C_1$.

Catalyst D (Control)

This catalyst was prepared by sequential impregnation of alumina with a P-O compound, then a Zr compound and finally a Ni compound. The promoter level of this catalyst was essentially the same as that of catalysts A, B and C. It was prepared by first impregnating 25.3 grams of material $C^1$ with a solution of 0.88 grams of $ZrO(NO_3)_2.5H_2O$ in 27.5 cc of water, drying and calcining as described for Catalyst C. The thus obtained material $D^1$ was impregnated with a solution of 1.21 grams of $Ni(NO_3)_2.6H_2O$ in 27.5 cc of water, dried and calcined as described for Catalyst C.

Catalyst E (Control)

This catalyst contained 1.91 weight-% Ni and 1.95 weight-% P. It was prepared by thoroughly mixing material $B^1$ with 25 cc of an aqueous solution containing 2.24 grams of $Ni(NO_3)_2.6H_2O$. Drying and calcining was carried out as described for Catalyst B.

Catalyst F (Control)

This catalyst contained 1.91 weight-% Zr and 1.95 weight-% P. It was prepared by thoroughly mixing material $B^1$ with 25 cc of an aqueous solution containing 1.61 grams of $ZrO(NO_3)_2.5H_2O$. Drying and calcining was carried out as described for Catalyst B.

EXAMPLE II

In this example, the automated experimental setup for investigating the hydrofining of heavy oils in accordance with the present invention is described. Oil was pumped downward through an induction tube into a trickle bed reactor, 28.5 inches long and 0.75 inches in diameter. The oil pump used was a reciprocating pump with a diaphragm-sealed head. The oil induction tube extended into a catalyst bed (located about 3.5 inches below the reactor top) comprising a top layer of about 40 cc of low surface area α-alumina (14 mesh Alundum; surface area less than 1 m²/gram), a middle layer of 50 cc (21.6 g) of one of the hydrofining catalysts described in Example I mixed with 70 cc of 36 mesh Alundum, and a bottom layer of about 30 cc of α-alumina.

The heavy oil feed was a Maya 400Ft residuum. The feed contained about 3.8 weight-% sulfur, 66 ppmw (parts per million by weight) nickel, 321 ppmw vanadium; it had a specific gravity of 0.97 and $API_{60}$ gravity of 14.0.

Hydrogen was introduced into the reactor through a tube that concentrically surrounded the oil induction tube but extended only to the reactor top. The reactor was heated with a 3-zone furnace. The reactor temperature was measured in the catalyst bed at three different locations by three separate thermocouples embedded in axial thermocouple well (0.25 inch outer diameter). The liquid product oil was generally collected every day for analysis. The hydrogen gas was vented. Vanadium and nickel contents were determined by plasma emission analysis and the sulfur content was measured by X-ray fluorescence spectrometry.

EXAMPLE III

This example illustrates the removal of metals (Ni, V) and sulfur from a heavy oil feed by hydrotreatment in the presence of Catalysts A-D. Pertinent process conditions were: LHSV of about 1.0 cc oil/cc catalyst/hr, hydrogen flow rate of about 2500 per cubic feet $H_2$ per barrel oil; reaction pressure of about 2250 psig; and reaction temperature of about 750° F. Pertinent test conditions and test results are summarized in Tables I and II. %-removal of Ni+V and %-removal S were corrected for variations in flow rate based on first order kinetics so as to give results one would have obtained at 1.0 LHSV.

TABLE I

| Run | Catalyst | Hour on Stream | Flow Rate (LHSV) | % Removal of S | % Removal of (Ni + V) | Wt % Metal on Catalyst |
|---|---|---|---|---|---|---|
| 1 (Invention) | A | 41 | 0.99 | 22.2 | 69.2 | 2.5 |
| | | 77 | 1.01 | 26.6 | 75.5 | 4.8 |
| | | 101 | 0.99 | 29.9 | 75.9 | 6.4 |
| | | 173 | 1.01 | 32.3 | 75.1 | 11.1 |
| | | 198 | 1.00 | 33.7 | 77.5 | 12.8 |
| | | 222 | 1.00 | 37.9 | 76.9 | 14.4 |
| | | 247 | 1.00 | 35.5 | 77.0 | 16.1 |
| | | 283 | 1.03 | 33.3 | 77.1 | 18.6 |
| | | 319 | 1.00 | 24.1 | 75.1 | 20.9 |
| | | 343 | 0.99 | 30.6 | 74.8 | 22.5 |
| | | 367 | 0.99 | 28.8 | 74.7 | 24.0 |
| | | Average: | | 30.4 | 75.3 | |
| 2 (Control) | B | 24 | 0.92 | (6.5)[1] | 64.6 | 1.2 |
| | | 48 | 1.08 | 12.4 | 72.3 | 2.6 |
| | | 72 | 0.93 | 22.4 | 69.0 | 3.8 |
| | | 96 | 0.96 | 27.6 | 69.9 | 5.1 |
| | | 120 | 1.01 | 17.0 | 70.9 | 6.5 |
| | | 144 | 1.05 | 16.7 | 73.3 | 7.9 |
| | | 170 | 1.10 | 22.1 | 70.1 | 9.4 |
| | | 194 | 1.02 | 20.6 | 71.1 | 10.7 |
| | | 218 | 0.93 | 24.9 | 67.8 | 12.0 |
| | | 242 | 0.97 | 27.3 | 69.7 | 13.3 |
| | | 266 | 0.93 | 30.3 | 67.4 | 14.5 |
| | | 290 | 1.04 | 30.9 | 68.9 | 15.8 |
| | | 314 | 1.04 | 22.4 | 70.3 | 17.2 |
| | | 338 | 1.06 | 28.8 | 70.8 | 18.5 |
| | | 362 | 1.06 | 23.9 | 69.3 | 19.9 |
| | | 386 | 1.04 | 28.2 | 69.1 | 21.2 |
| | | 410 | 0.97 | 22.7 | 68.3 | 22.5 |

TABLE I-continued

| Run | Catalyst | Hour on Stream | Flow Rate (LHSV) | % Removal of S | % Removal of (Ni + V) | Wt % Metal on Catalyst |
|---|---|---|---|---|---|---|
| | | Average: | | 23.6 | 69.6 | |
| 3 (Control) | C | 32 | 1.01 | 17.0 | 60.6 | 1.7 |
| | | 56 | 0.98 | 12.9 | 64.8 | 3.0 |
| | | 80 | 1.01 | 22.0 | 69.2 | 4.5 |
| | | 104 | 1.02 | 22.0 | 70.8 | 6.0 |
| | | 128 | 0.96 | 26.1 | 71.6 | 7.4 |
| | | 152 | 1.03 | 29.8 | 77.0 | 9.1 |
| | | 176 | 1.01 | — | 77.2 | 10.7 |
| | | 200 | 1.03 | 34.6 | 78.2 | 12.4 |
| | | 224 | 1.01 | — | 72.5 | 13.9 |
| | | 248 | 1.03 | — | 75.3 | 15.5 |
| | | 273 | 1.04 | — | 75.0 | 17.2 |
| | | 297 | 1.02 | — | 71.9 | 18.7 |
| | | 330 | 1.03 | — | 71.9 | 20.8 |
| | | 354 | 1.01 | — | 71.2 | 22.3 |
| | | Average: | | 23.5 | 71.9 | |
| 4 (Control) | D | 31 | 1.01 | (8.0)[1] | (48.8)[1] | 1.3 |
| | | 55 | 0.99 | 11.5 | 57.8 | 2.5 |
| | | 79 | 1.02 | 19.5 | 59.9 | 3.8 |
| | | 103 | 1.01 | 22.8 | 62.0 | 5.1 |
| | | 127 | 0.98 | 23.5 | 67.3 | 6.5 |
| | | 175 | 0.98 | 20.8 | 66.9 | 9.2 |
| | | 199 | 0.98 | 19.0 | 66.7 | 10.6 |
| | | 223 | 1.08 | 21.0 | 74.0 | 12.2 |
| | | 247 | 1.08 | 21.3 | 73.8 | 13.8 |
| | | 272 | 0.95 | 22.3 | 70.7 | 15.3 |
| | | 296 | 1.00 | 16.6 | 69.5 | 16.8 |
| | | 331 | 1.08 | 20.7 | 70.4 | 19.0 |
| | | 355 | 0.98 | 16.8 | 70.0 | 20.5 |
| | | Average: | | 19.7 | 67.4 | |
| 5 (Control) | E | 23 | 1.06 | 14.2 | 62.0 | 1.2 |
| | | 47 | 0.98 | 14.8 | 60.9 | 2.4 |
| | | 71 | 0.98 | 15.5 | 61.5 | 3.6 |
| | | 95 | 0.98 | 15.8 | 63.2 | 4.8 |
| | | 119 | 0.97 | 18.7 | 64.8 | 6.0 |
| | | 143 | 0.97 | 27.4 | 66.7 | 7.3 |
| | | 162 | 0.98 | 20.3 | 65.6 | 8.3 |
| | | 186 | 1.00 | 15.8 | 68.1 | 9.7 |
| | | Average: | | 17.8 | 64.1 | |
| 6 (Control) | F | 130 | 1.00 | 33.0 | 67.0 | 10.3 |
| | | 154 | 1.01 | 26.1 | 67.6 | 11.5 |
| | | 191 | 0.99 | 26.8 | 68.3 | 14.2 |
| | | 214 | 1.00 | 24.2 | 68.3 | 15.5 |
| | | 272 | 0.99 | 26.8 | 67.3 | 19.7 |
| | | 297 | 0.98 | 26.1 | 67.3 | 21.1 |
| | | 321 | 0.98 | 32.1 | 66.6 | 22.4 |
| | | 345 | 1.01 | 22.2 | 69.3 | 23.8 |
| | | 369 | 1.05 | 19.4 | 63.8 | 25.2 |
| | | 393 | 1.02 | 21.8 | 64.8 | 26.5 |
| | | 417 | 1.04 | 31.7 | 70.3 | 27.9 |
| | | Average: | | 26.4 | 67.3 | |

[1]result believed to be erroneous, not included in Average.

Data in Table I clearly show that the removal of Ni+V and of S was highest for invention Catalyst A (prepared by impregnation of $Al_2O_3$ first with Ni Zr and then with P). Control Catalysts B, C and D contained the same amounts of Ni, Zr and P as invention Catalyst A but were prepared by a different impregnation sequence. Control Catalyst E contained no Zr but twice as much Ni as invention Catalyst A; and control Catalyst F contained no Ni but twice as much Zr as invention Catalyst A. Control Catalyst B through E were clearly inferior to Invention Catalyst A with regard to hydrodemetallization and hydrodesulfurization activity.

EXAMPLE V

This example illustrates the effect of the addition of small amounts of a thermally decomposable molybdenum compound, $Mo(CO)_6$, to an undiluted Monagas pipeline oil feed containing about 336 ppm V and about 87 ppm Ni on the removal of these metals in the presence of a commercial hydrofining catalyst containing about 0.9 weigh-% CoO, 0.5 weight-% NiO, 7.3 weight-% MoO and about 91 weight-% $Al_2O_3$, having a surface area of about 180 m$^2$/g. LHSV of the feed for both runs ranged from about 1.0 to 1.1 cc/cc catalyst/hr, the temperature was about 765° C. (407° C.), the pressure was about 2250 psig, and the hydrogen feed rate was about 4800 SCF/barrel oil. Experimental data are summarized in Table IV.

TABLE IV

| Days on Stream | Run 7 | | Run 8 | |
|---|---|---|---|---|
| | PPM Mo in Feed | % Removal of (Ni + V) | PPM Mo in Feed | % Removal % (Ni + V) |
| 5 | 0 | 64 | 17 | 72 |
| 12–13 | 0 | 62 | 17 | 71 |
| 17 | 0 | 59 | 7 | 70 |
| 20–21 | 0 | 61 | 7 | 65 |
| 26 | 0 | 58 | 7 | 64 |
| 32–33 | 0 | 53 | 7 | 65 |
| 41 | 0 | 52 | 7 | 70 |
| 52–53 | 0 | 41 | 7 | 66 |
| 58–59 | 0 | 43 | 4 | 65 |

Data in Table IV clearly show the beneficial effect of added small amounts of Mo (as Mo(CO)$_6$) to the feed on the demetallization of the oil in the presence of a commercial hydrofining catalyst was used. Based on these results, it is presently preferred to introduce a thermally decomposable Mo compound (such as carbonyl, dithiophosphates, dithiocarbamates and the like) into the feed that is hydrotreated with the catalyst composition of this invention.

Reasonable variations and modifications are possible within the scope of the disclosure and the appended claims.

We claim:

1. A process for hydrotreating a hydrocarbon-containing feed stream comprising the step of simultaneously contacting a substantially liquid hydrocarbon-containing feed stream, which also contains compounds of nickel, vanadium and sulfur, with a free hydrogen-containing gas and a catalyst composition comprising alumina, at least one compound of nickel, at least one compound of zirconium and at least one compound containing phosphorus and oxygen, under such hydrotreating conditions as to produce a hydrocarbon-containing stream having a reduced level of at least one of nickel, vanadium and sulfur, wherein said catalyst composition has been prepared by a process comprising the steps of:
(A) impregnating a support material comprising alumina with a solution comprising water, at least one compound of nickel and at least one compound of zirconium;
(B) heating the material obtained in step (A) under such conditions as to substantially dry said material obtained in step (A),
(C) impregnating the substantially dried material obtained in step (B) with a solution containing water and at least one compound containing phosphorus and oxygen;
(D) heating the material obtained in step (C) at a first temperature so as to at least partially dry said material obtained in step (C);
(E) heating the at least partially dried material obtained in step (D) at a second temperature, which is higher than said first temperature, so as to activate said at least partially dried material obtained in step (D).

2. A process in accordance with claim 1, wherein said hydrocarbon-containing feed stream contains about 3–500 ppmw nickel, about 5–1000 ppmw vanadium and about 0.3–5 weight-% sulfur.

3. A process in accordance with claim 1, wherein said hydrotreating conditions comprise a reaction temperature in the range of from about 250° C. to about 550° C., a reaction pressure in the range of from about 0 to about 5,000 psig, a reaction time in the range of from about 0.05 to about 10 hours, and an amount of added hydrogen gas in the range of from about 100 to about 10,000 standard cubic feet H$_2$ per barrel of hydrocarbon-containing feed stream.

4. A process in accordance with claim 1, wherein said hydrotreating conditions comprise a reaction temperature in the range of from about 350° to about 450° C., a reaction pressure in the range of from about 100 to about 2,500 psig, a reaction time in the range of from about 0.4 to about 5 hours, and an amount of added hydrogen gas in the range of from about 1,000 to about 6,000 standard cubic feet H$_2$ per barrel of hydrocarbon-containing feed stream.

5. A process in accordance with claim 1, wherein to said hydrocarbon-containing feed stream has been added at least one thermally decomposable compound of a metal selected from the group consisting of metals belonging to Groups IB, IVB, VB, VIB, VIIB and VIII of the Periodic Table of Elements.

6. A process in accordance with claim 5, wherein the at least one added thermally decomposable metal compound is a molybdenum compound and the added molybdenum content in the hydrocarbon-containing feed stream is about 1–100 ppmw Mo, based on the entire hydrocarbon-containing feed stream.

7. A process in accordance with claim 1, wherein the solution used in step (A) contains about 0.01–3.0 mol/1 Ni and about 0.01–3.0 mol/1 Zr, and the solution used in step (C) contains about 0.02–6.0 mol/1 P.

8. A process in accordance with claim 1, wherein the solution used in step (A) contains about 0.02–1.0 mol/1 Ni and about 0.02–1.0 mol/1 Zr, and the solution used in step (C) contains about 0.04–2.0 mol/1 P.

9. A process in accordance with claim 1, wherein said heating in step (B) is carried out at a temperature in the range of from about 40° to about 600° C., said first temperature in step (D) is in the range of from about 40° to about 600° C., and said second temperature in step (E) is in the range of from about 200° to about 800° C.

10. A process in accordance with claim 1, wherein said heating in step (B) is carried out at a temperature in the range of from about 80° to about 500° C., said first temperature in step (D) is in the range of from about 50° to about 200° C., and said second temperature in step (E) is in the range of from about 400° to about 600° C.

11. A process in accordance with claim 1, wherein the process for preparing said catalyst composition comprises the additional step of
(F) contacting the calcined material obtained in step (E) with at least one suitable sulfur compound under such conditions as to at least partially convert nickel compounds contained in said calcined material to nickel sulfide.

12. A process in accordance with claim 1, wherein said catalyst composition contains about 0.1 to about 10 weight-% Ni, about 0.2 to about 15 weight-% Zr, and about 0.1 to about 10 weight-% P, all based on the calcined catalyst composition obtained in step (E), and has a surface area in the range of from about 20 to about 350 m²/g.

13. A process in accordance with claim 1, wherein said catalyst composition contains about 0.3 to about 3.0 weight-% Ni, about 0.5 to about 5.0 weight-% Zr, and about 0.3 to about 5.0 weight-% P, all based on the calcined catalyst composition obtained in step (E), and has a surface area in the range of from about 100 to about 250 m²/g.

* * * * *